(12) United States Patent
Iversen et al.

(10) Patent No.: US 11,796,863 B1
(45) Date of Patent: Oct. 24, 2023

(54) MULTIVIEW DISPLAY

(71) Applicant: Realfiction Lab Aps, Copenhagen (DK)

(72) Inventors: Steen Iversen, Copenhagen (DK);
Flemming Skriver Kloster,
Copenhagen (DK)

(73) Assignee: Realfiction Lab Aps, Copenhagen (DK)

( * ) Notice: Subject to any disclaimer, the term of this patent is extended or adjusted under 35 U.S.C. 154(b) by 0 days.

(21) Appl. No.: 18/309,143

(22) Filed: Apr. 28, 2023

(51) Int. Cl.
*G02F 1/13357* (2006.01)
*G02F 1/1335* (2006.01)

(52) U.S. Cl.
CPC .. *G02F 1/133611* (2013.01); *G02F 1/133607* (2021.01); *G02F 1/133613* (2021.01)

(58) Field of Classification Search
None
See application file for complete search history.

(56) References Cited

FOREIGN PATENT DOCUMENTS

JP 4845893 B2 * 12/2011 ......... G02B 27/2214

* cited by examiner

*Primary Examiner* — Phu Vu
(74) *Attorney, Agent, or Firm* — Dinsmore & Shohl LLP

(57) ABSTRACT

A multiview display including a LCD panel for generating first and second images, a backlight including first and second light sources, the first light source illuminating the LCD panel the first image is generated and the second light source illuminating the LCD panel when the second image is generated, optical devices between the backlight and the LCD panel and including: an aperture mask comprising a plurality of apertures, the aperture mask blocking light from the light sources from reaching opposite viewing zones, and a lenticular sheet positioned adjacent to the aperture mask, first and second diffusers disposed between the backlight and the optical devices, and arranged for diffusing light horizontally and vertically, where a longitudinal axis of each aperture has an angle of 5 to 30 degrees.

10 Claims, 6 Drawing Sheets

MULTIVIEW DISPLAY

BACKGROUND

Field

The present specification generally relates to displays, and more specifically, to displays that have more than one viewing zone.

Technical Background

Displays are used for a multitude of items in modern times. Some displays, such as, for example, displays in a vehicle, may provide information about a variety of things, e.g., a speedometer display, a fuel level or battery state of charge display, a navigation display, an infotainment display, or the like. It may be desired to have a plurality of independent displays for each particular use, but the use of a plurality of displays increases weight, expense, complexity, and may result in an overall displeasing aesthetic. In addition, manufacturers may be limited by certain shapes and sizes that can be used.

SUMMARY

The present disclosure is directed to a multiview display. A multiview display in the context of the present disclosure is to be understood as a display having at least two viewing zones where a first image can be seen in the first viewing zone and a second image can be seen in the second viewing zone. An example could be the center screen in a car where both a driver and a passenger may observe the center screen. The driver may wish to see navigation information while the passenger may wish to watch a movie. A multiview display may allow the passenger to watch a movie (which is prohibited in many countries for the driver) and the illumination towards the driver at night may also be reduced, because the driver is in another viewing zone than the passenger, and the brightness may be reduced for the image directed to the driver viewing zone.

A first aspect of the present disclosure is a multiview display for displaying a first image in a first viewing zone and a second image in a second viewing zone, said multiview display comprising: a LCD panel for generating said first image and said second image, a backlight layer including a first light source and a second light source, said first light source illuminating said LCD panel when said LCD panel generating said first image, and said second light source illuminating said LCD panel when said LCD panel generating said second image, said first light source including a first set of light emitters, the light emitters of said first set of light emitters distributed in a first distribution across said backlight layer, a layer of optical devices arranged between said backlight and said LCD panel, said layer of optical devices comprising an aperture mask or a parallax barrier for blocking light from said first light source to reach said second viewing zone and blocking light from said second light source to reach said first viewing zone such that said first image being visible only in said first viewing zone, and said second image being visible only in said second viewing zone.

A second aspect of the present disclosure is a multiview display for displaying a first image in a first viewing zone and a second image in a second viewing zone, said multiview display comprising: a LCD panel for generating said first image and said second image, a backlight including a first light source and a second light source, said first light source illuminating said LCD panel when said LCD panel generating said first image, and said second light source illuminating said LCD panel when said LCD panel generating said second image, a layer of optical devices arranged between said backlight and said LCD panel, said layer of optical devices directing more light from said first light source to said first viewing zone than to said second viewing zone such that said first image being visible in said first viewing zone, and directing more light from said second light source to said second viewing zone than to said first viewing zone such that said second image being visible in said second viewing zone.

A third aspect of the present disclosure is a method for displaying a first image in a first viewing zone and a second image in a second viewing zone, said method comprising: providing a LCD panel for generating said first image and said second image, providing a backlight including a first light source and a second light source, providing a layer of optical devices arranged between said backlight and said LCD panel, said layer of optical devices comprising an aperture mask or a parallax barrier for blocking light from said first light source to reach said second viewing zone and blocking light from said second light source to reach said first viewing zone such that said first image being visible only in said first viewing zone, and said second image being visible only in said second viewing zone, illuminating said LCD panel by means of said first light source and generating said first image by means of said LCD panel, and illuminating said LCD panel by means of said second light source and generating said second image by means of said LCD panel.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
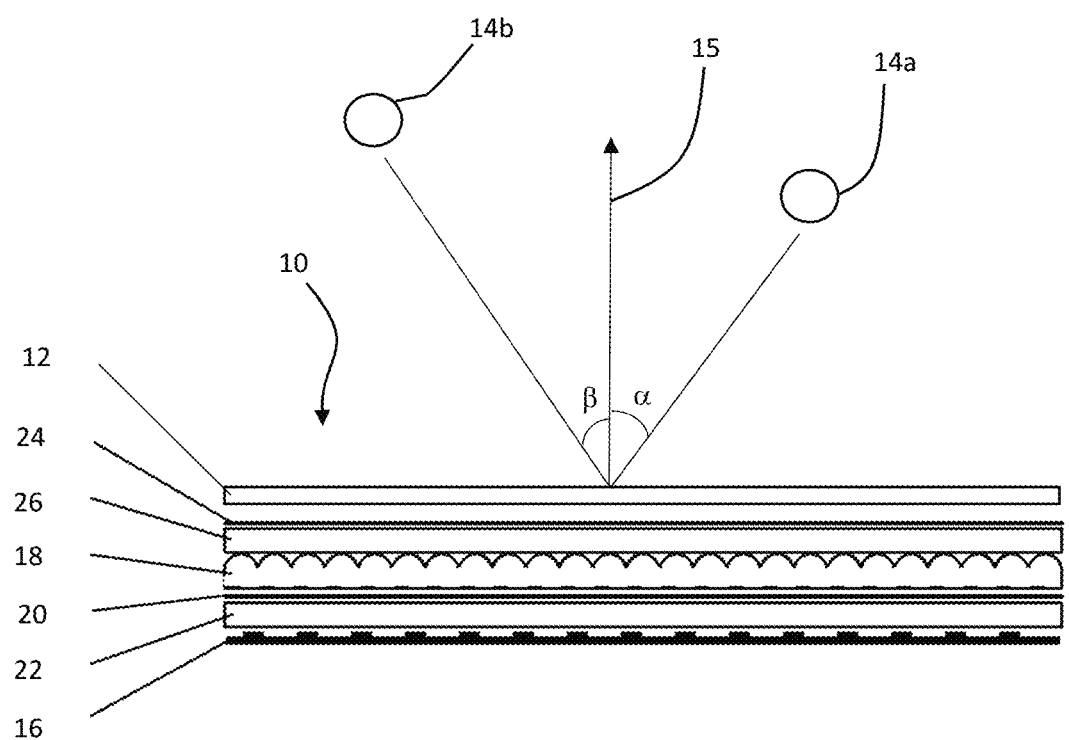
FIG. 1 schematically depicts a top view of a multiview display according to one or more aspects shown and described herein.

The present disclosure relates to a multiview display in which the layer of optical devices is arranged to define a first radiation pattern of the multiview display for when the first backlight source is on and a second radiation pattern of the multiview display for when the second backlight source is on.

The first radiation pattern may have its main lope in the first viewing region, and the second radiation pattern may have its main lope in the second viewing region. The main lope is the angle range where the greatest illumination from the display is directed to.

Thus, the layer of optical devices serves to limit the angle range from the two backlight sources so that the multiview display does not have a uniform radiation pattern when the first backlight is on and also not when the second backlight is on.

The desired radiation pattern is achieved by means of blocking light, i.e. by using an aperture mask or a parallax barrier such as a micro louver film such that light from the first light source is blocked from reaching the second viewing zone and light from the second light source is blocked from reaching the first viewing zone.

Lenses may also be used to achieve the effect, but this requires a large number of backlight LEDs and an individual lens for each LED. This is smart for a 3D display, but for a multiview display it will unnecessarily complicate the design.

The layer of optical devices may be arranged such that the angle range or radiation pattern of the multiview display may be different from when the first backlight source is on and when the second backlight source is on. For example in order to have a first viewing zone that is visible from a greater range of observation angles than the second viewing zone, i.e. the two viewing zones may be asymmetric, and the first viewing zone may cover observations angles between 20 to 50 degrees to the right with respect to the normal of the display, and the second viewing zone may cover observation angles between 20 degrees to the right to 80 degrees to the left with respect to the normal of the display.

The layer constituted by the backlight has a physical area. Within this area the light sources of the backlight may be distributed/arranged/spread out across the area.

The first viewing zone may be to the left of the multiview display and the second viewing zone may be to the right of the display, i.e. a first observer positioned to the left of the multiview display can see the first image, because the observer is positioned in the first viewing zone.

A second observer positioned to the right of the multiview display can see the second image, because the observer is positioned in the second viewing zone.

A viewing zone may also be termed viewing region or eye box, and it is a space in front of the multiview display.

Normally, an observation angle of an observer with respect to a display is defined as the angle between the normal to the display and a straight line between the display and the observer. 3D displays and multiview displays are configured to emit light in specific angles or directions so that the light and thereby the image generated by such a display is only visible when the observer is positioned at such a specific angle. Outside from that angle such a display may appear dark.

The backlight may comprise a third light source for illuminating the LCD panel when the LCD panel generates the first image. The third light source may be arranged at a vertical position being lower than the vertical position of the second light source, i.e. seen in a vertical plane when the display is in an upright position such as hanging on a wall the second light source may be between the first light source and the third light source.

The layer of optical devices could comprise a lenticular sheet or a parallax barrier such as a micro louver film.

The two viewing zones are defined by the configuration of the layer of optical devices such that light from the first backlight source is directed to the first viewing zone and light from the second backlight source is directed to the second viewing zone. Thus, the first image will be visible in the first viewing zone, but not in the second viewing zone, and vice versa: the second image will be visible in the second viewing zone, but not in the first viewing zone. This directionality is made possible by the layer of optical device.

The layer of optical device may have a first optical device for directing light to the first viewing zone, and a second optical device for directing light to the second viewing zone—the second optical device arranged in a horizontal plane arranged below the horizontal plane the first optical device is arranged in, i.e. the second optical device is below the first optical device when the display is in an upright position, i.e. for example hanging on a wall.

There may also be a third optical device for directing light to the first viewing zone, the third optical device arranged below the second optical device.

The light direction may be achieved by masking, i.e. light from the first optical device is masked/blocked from reaching the second viewing zone and light from the second optical device is masked/blocked from reaching the first viewing zone.

The layer of optical devices may comprise blinds/optical mask for blinding/masking light from the first light source to reach the second viewing zone, and vice versa blinding/masking light from the second light source to reach the first viewing zone.

The blinds may be constituted by a parallax barrier such as a micro louver film.

In the case of an optical mask there is also lenses (lenticular sheet), for refracting the light that goes through an aperture in the desired direction.

An optical mask may be arranged between the backlight and the LCD on either side of the lenses. The lens may focus an image of the optical mask towards observers, transmitting more light in the direction towards the first viewing zone than in the direction of the second viewing zone. In the case of a parallax barrier the barrier essentially blocks light from being seen from one or more directions. The layer of optical devices may be designed using simulation tools, for example a ray tracing software.

The LCD display may be constituted by a multilayer comprising a layer of liquid crystal for modulating the backlight, and an electrode layer for switching the liquid crystal and a polarizer. Usually the layer of liquid crystals is sandwiched by an electrode layer on each side and a polarizer on each side.

The LCD display generates an image by reading image data from a file defining the pixel value of each pixel in the display. A voltage is applied across each image pixel in the liquid crystal display corresponding to the pixel values of the file. This defines the transmission through each image pixel in the LCD display, and when light from the backlight is transmitted through the LCD display an image is visible to the observer.

The LCD panel may be time multiplexed so that the first image is generated before the second image. This increases the requirement to the response time of the liquid crystals compared to a normal display where only one image is generated, because there is only one viewing zone. Faster liquid crystals may be used compared to the liquid crystals used in traditional displays.

In the following specific examples according to aspects of the present disclosure will be explained in more detail with reference to the accompanying drawings. The present disclosure may, however, be embodied in different forms than depicted below, and should not be construed as limited to any examples set forth herein. Rather, any examples are provided so that the disclosure will be thorough and complete, and will fully convey the scope of the invention to those skilled in the art. Like reference numerals refer to like elements throughout. Like elements will, thus, not be described in detail with respect to the description of each figure.

FIG. 1 illustrates a top view of a multiview display 10.

A LCD panel 12 is used to generate an image. The LCD panel faces the observers in front of the multiview display. Two observers 14a, 14b are illustrated. The first observer 14a having an observation angle α with respect to the normal 15 to the multiview display (the normal being the line extending orthogonal to the display). The second observer 14b having an observation angle β with respect to the multiview display. Thus, the first observer is to the left of the multiview displayed when facing the display and the second observer to the right. The first observer is said to be positioned in a first viewing zone and the second observer is said to be positioned in a second viewing zone.

A first image is visible in the first viewing zone, but not in the second viewing zone, and likewise a second image is visible in the second viewing zone but not in the first viewing zone. There may be cross talk between the two images when observing the display directly in front of the display, i.e. when an observer is positioned with an observation angle of 0 degrees with respect to the normal.

The LCD panel is illuminated by a backlight 16.

Between the backlight and the LCD panel is a layer of optical devices 18.

Between the backlight and the layer of optical devices is a first (optical) diffuser 20 for diffusing light horizontally, which may be spaced from the backlight by means of a spacer 22 such as an acrylic spacer.

The first diffuser may be a horizontal diffuser for example. A horizontal diffuser is understood as a diffuser having a higher degree of light diffusion in a horizontal plane than in vertical plane. It is important that the first diffuser does not diffuse light in a vertical plane to a degree such that cross talk exist between the two viewing zones, i.e. something from image for the first viewing zone is visible in the second viewing zone or vice versa.

The backlight may be constituted by light emitters such as discrete LEDs positioned with distance to each other. The closer (and thereby the higher number) the light emitters are to each other the more even is the illumination of the LCD panel (and the multiview panel appears more uniform to an observer). The diffuser in front of the light emitters may even out the light distribution. The distance between the backlight and the horizontal diffuser depends on the spacing between the light emitters. The greater the spacing the greater the distance between the backlight and the horizontal diffuser in order to provide a more even illumination.

Between the layer of optical devices and the LCD panel is a second diffuser 24, which may be spaced from the layer of optical devices by means of a second spacer 26 such as an acrylic spacer.

The second diffuser may be a vertical diffuser. A vertical diffuser is understood as a diffuser having a higher degree of light diffusion in a vertical plane than in a horizontal plane.

For a display it is important that it appears uniform across the screen in order to have a good user experience. If the display emits more light in some parts of the screen than others it may give a less optimal user experience.

It is important that the first diffuser is before the layer of optical devices and the second diffuser is after, because the angular resolution of the display (the two viewing zones amounts to an angular resolution of 2) is to be in the horizontal plane, i.e. the horizontal diffusion and the vertical diffusion cannot be interchanged, because that would mean that the angular resolution in a horizontal plane provided by the layer of optical devices would be diffused horizontally in front of the layer of optical devices.

Figure 2:
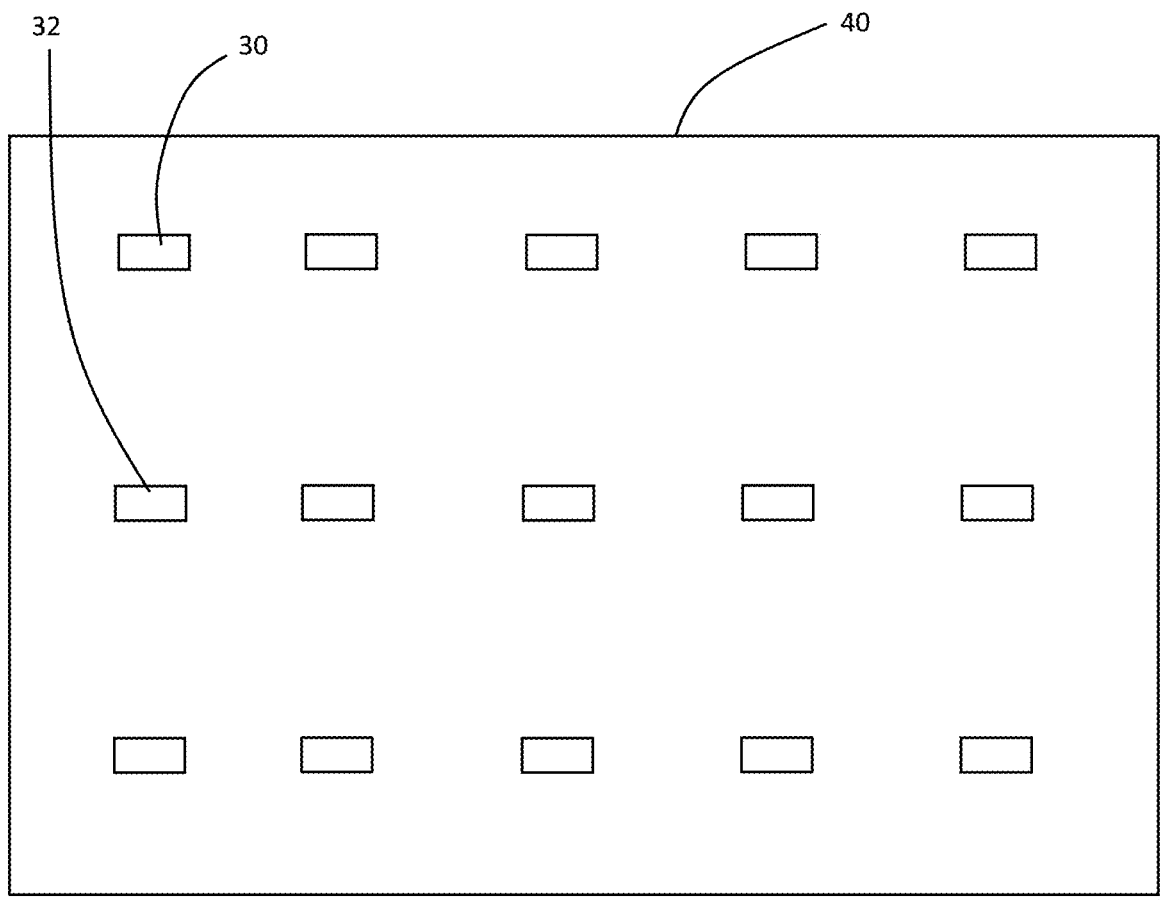
FIG. 2 depicts an illustrative backlight according to one or more aspects shown and described herein.

FIG. 2 shows an example of a backlight 16.

The backlight is contemplated to comprise a first light source and a second light source. There is a spatial resolution between the two light sources, i.e. the two light sources are in different positions, preferably one above the other seen vertically in order to achieve a horizontal resolution of viewing zone—when the display is standing upright in its intended operational position (for example hanging on a wall in a living room, although in some cases it may have an inclination if the display is mounted in a car or as an exception be mounted in the floor or ceiling).

In FIG. 2 it is illustrated that the first light source may have a first set of light emitters including a first light emitter 30. The light emitters of the first set of light emitters may have a distribution or pattern across the backlight layer, i.e. distributed across the area of the backlight layer in a specific pattern.

The second light source may have a second set of light emitters including a second light emitter 32—the second light emitter is in a horizontal plane arranged below the horizontal plane the first light emitter is arranged in, i.e. the second light emitter is below the first light emitter.

The light emitters of the second set of light emitters may have a distribution or pattern across the backlight layer, i.e. distributed across the area of the backlight layer in a specific pattern.

The distribution of light emitters of the first set of light emitters may be different from the distribution of light emitters of the second set of light emitters.

A "set of" in the present context means a plurality of the same type or having the same function or purpose.

All of the light emitters may be arranged in a grid.

15 light emitters are illustrated in the grid of FIG. 2 (the distribution of light emitters is constituted by 5 light emitters in each row line and 3 light emitters in each column line).

In general the term "line" refers in the following to row lines, but the row lines and column lines may be interchanged corresponding to rotating the display 90 degrees.

The light emitters of the first set of light emitters and of the second set of light emitters are arranged in an alternating pattern.

As an example the alternating pattern may comprise a sequence of (row) lines where each line in the sequence of lines has light emitters either from the first set of light emitters or from the second set of light emitters.

Thus, a number of lines in the grid has light emitters of the first set of light emitters. These lines are followed by a number of lines in the grid having light emitters of the second set of light emitters. These lines are then followed by a number of lines having light emitters of the first set of light emitters and so forth depending on the total number of lines in the grid.

In FIG. 2 the first (row) line has light emitters from the first set of light emitters. The second (row) line has light emitters from the second set of light emitters. And the third line has light emitters from the first set of light emitters.

When the multiview display generates the first image it is then illuminated by the lines having light emitters from the first set of light emitters, i.e. in FIG. 2 the first and third line.

When the multiview display generates the second image it is then illuminated by the lines having light emitters from the second set of light emitters, i.e. in FIG. 2 the second line.

Any order/sequence/pattern of lines may be contemplated, but an even-odd sequence gives a uniform illumination, i.e. light emitters from the first set being on odd lines and light emitters from the second set being on even lines.

The lines may be row lines in order to achieve a horizontal resolution of viewing zones, i.e. a row line only has light emitters from one set.

The pattern or distribution of light emitters from the two sets of light emitters across the display area (the area 40 available to place light emitters on in the backlight panel/layer) may also be a zig-zag pattern, i.e. each line with light emitters from the first set of light emitters is zig-zagged.

If the display were to have three viewing zones there would be a need for one more set of light emitters.

Figure 3:
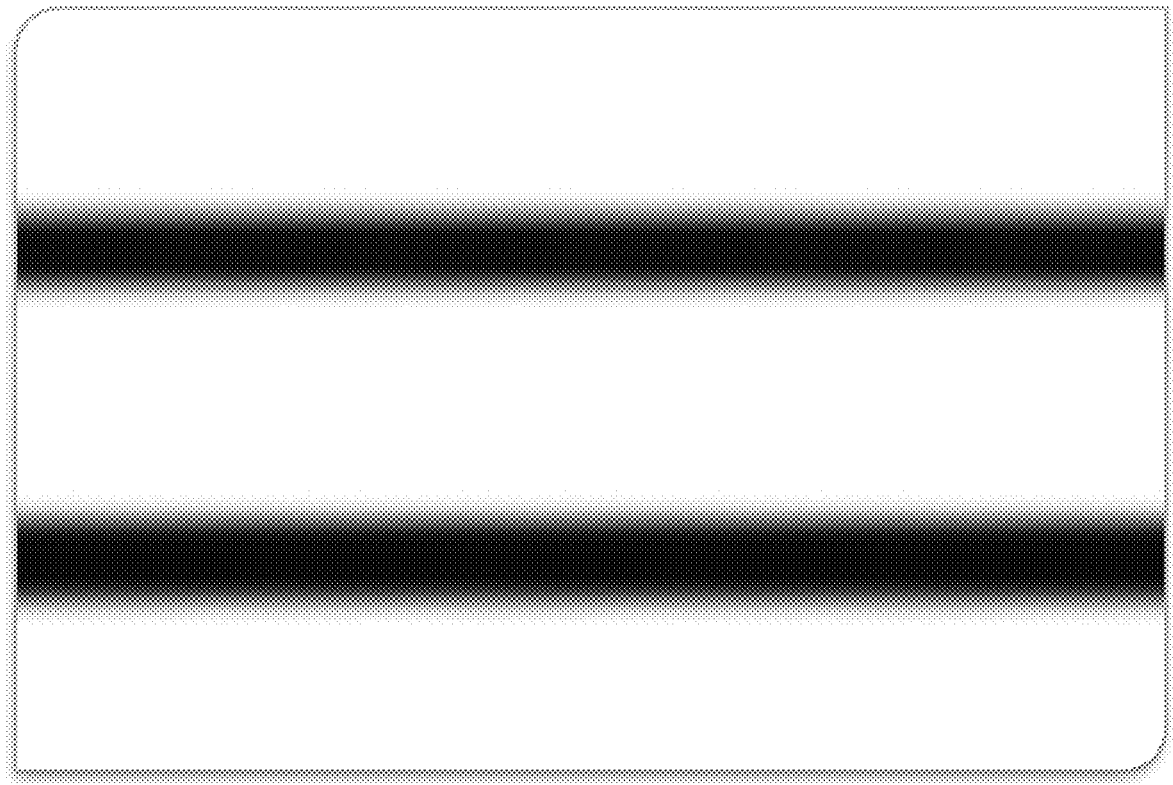
FIG. 3 depicts an illustrative effect of the horizontal diffuser according to one or more aspects shown and described herein.

FIG. 3 shows the effect of the horizontal diffuser.

In FIG. 3 the light elements in all three lines are on. This will of course not be the case when the display is operating as a multiview display.

It can be seen that the light source of each light emitter is basically no longer visible and instead of having five discrete sources of light in each line the whole line appears as having a uniform radiation along the line.

It can also be seen that the lines have a vertical distance between each other in order to minimize cross talk, i.e. there need to be a dark zone between the lines with different light emitters (belonging to the two different sets).

Figure 4A:
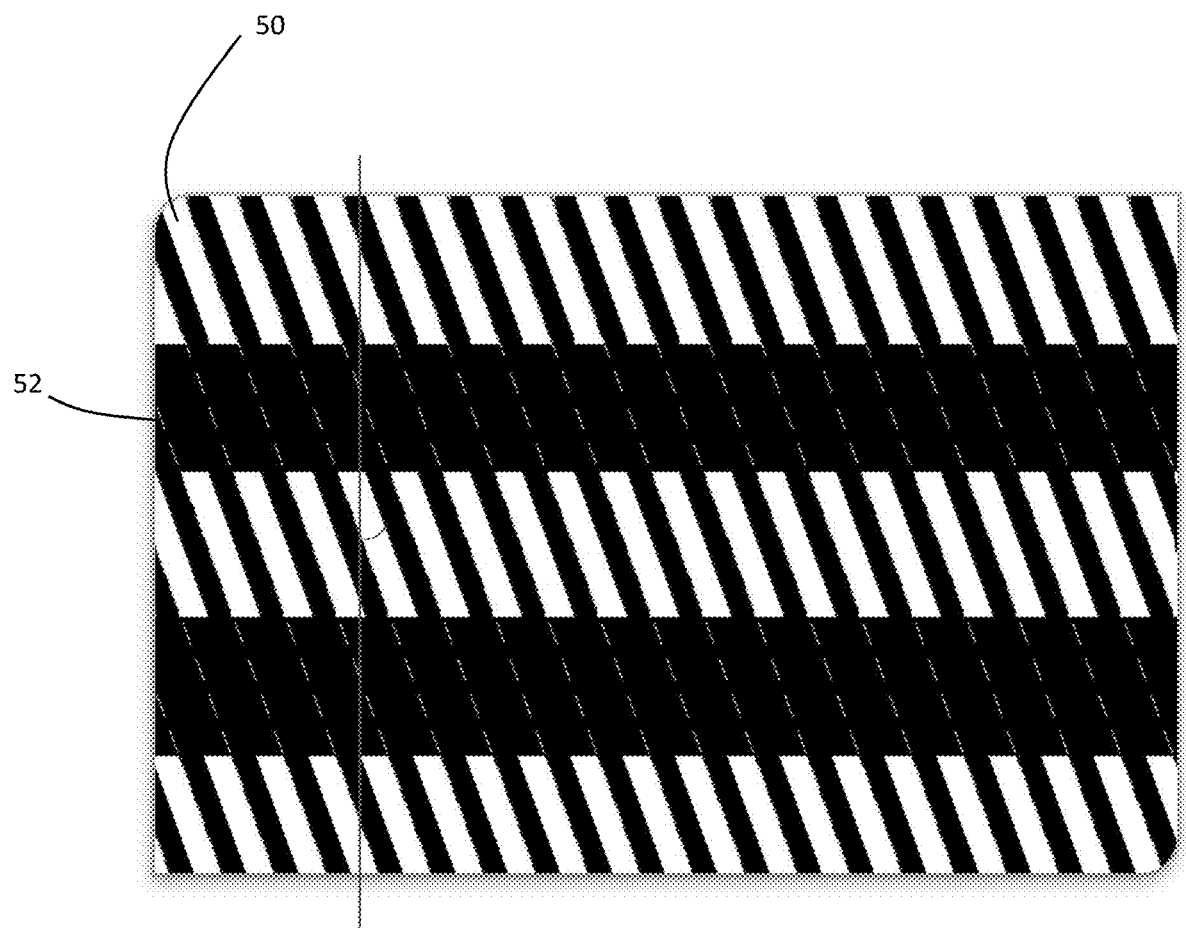
FIG. 4A depicts an illustrative layer of optical devices according to one or more aspects shown and described herein.

FIG. 4a shows an example of a layer of optical devices.

Figure 4B:
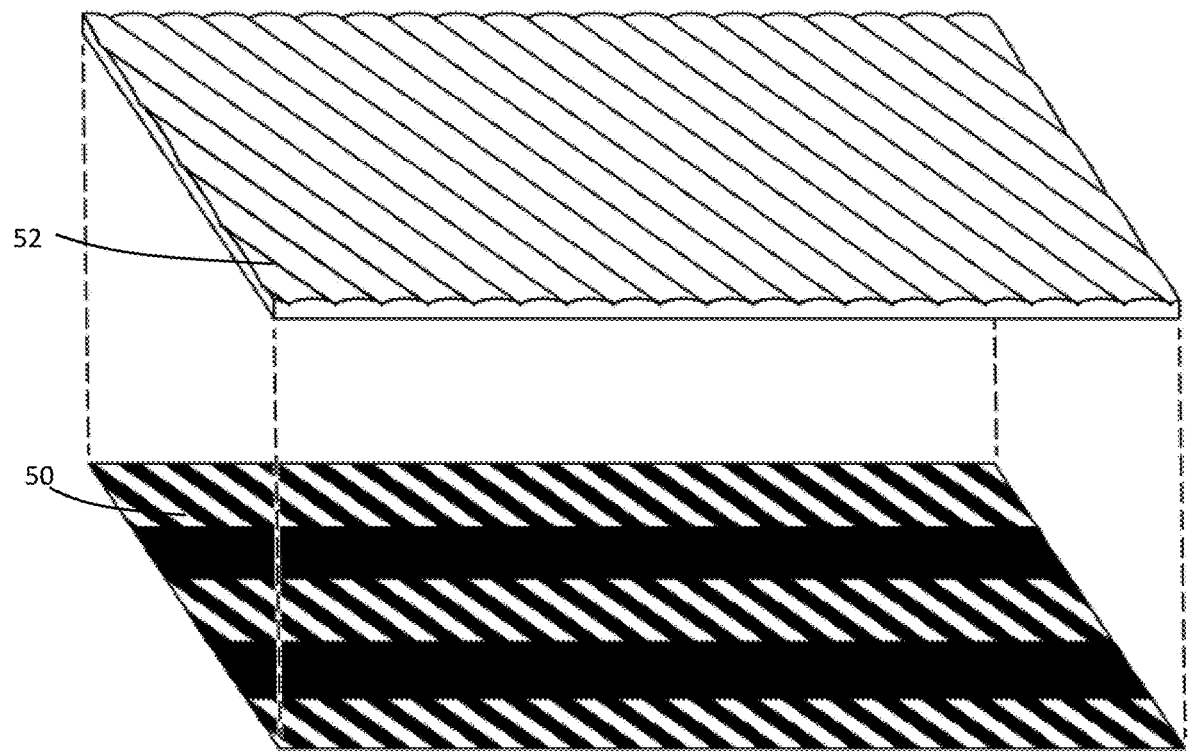
FIG. 4B depicts an exploded view of an aperture mask and lenticular sheet according to one or more aspects shown and described herein.
Figure 4C:
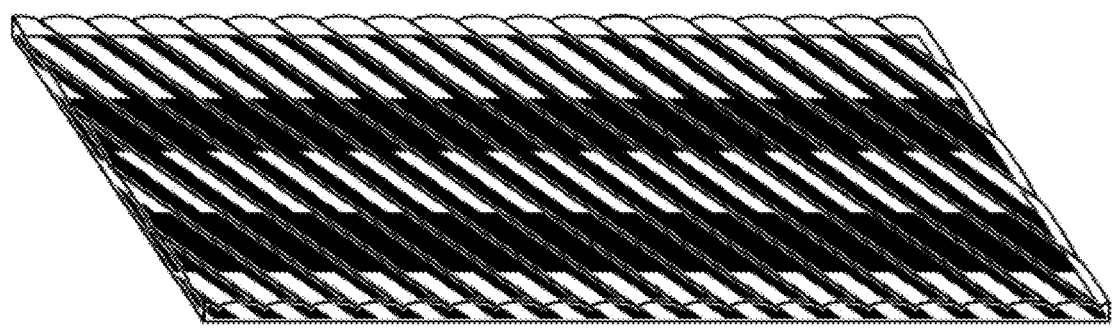
FIG. 4C depicts a perspective view of an aperture mask and lenticular sheet according to one or more aspects shown and described herein.

In the example of FIG. 4a the layer of optical elements comprises an aperture mask arranged behind a lenticular sheet, i.e. a layer having optical elements with an optical power such as lenses or prisms or a combination—the aperture mask may also be arranged in front of the lenticular sheet. The aperture mask and lenticular sheet are shown in an exploded perspective view in FIG. 4b, and in FIG. 4c the aperture mask and lenticular sheet are shown in a perspective view.

As an alternative the layer may be constituted by a parallax barrier such as a micro louvre film, i.e. small parallel blinds.

The openings/apertures in the aperture mask are illustrated as white on black background and includes a first aperture 50. The width of an aperture may be 0.5 mm, and the height may be at least 3 times such as 6 times as high as it is wide.

The apertures are arranged in (horizontal/row) lines in this example, because the light emitters of the backlight are arranged in lines. Three row lines are illustrated.

Each aperture is in the shape of a parallelogram, but other shapes for the apertures may be contemplated, for example rectangular or elliptical.

Each aperture is slanted/tilted/inclined (the longitudinal axis of an aperture is not vertical, but has an angle with respect to a vertical line). The longitudinal axis is a to be understood as a centerline (joining two edges/sides) of the aperture, and not a diagonal. The vertical line and angle are illustrated in red color in the figure.

The angle may be greater than zero degrees and less than 90 degrees with respect to vertical, i.e. neither vertical nor is it horizontal, for example 5 to 30 degrees such as 20+/−5 degrees such as 15+/−5 degrees such as 15+/−10 degrees such as 10+/−5 degrees. In FIG. 4 it is illustrated as more vertical (without being vertical) than horizontal, i.e. a larger (non-zero) component along the vertical axis than the (non-zero) component along the horizontal axis. To compare to a horizontal plane the angle would be calculated as 90-20+/−5=70+/−5 degrees.

In general the shape of the apertures and the inclination depend on each other, i.e. the inclination is a function of the shape. For example, if the width of the apertures is made smaller the inclination has to be larger.

This is to avoid artifacts such as black lines in the image. The transition from one lens to another may cause such artifacts.

In general it is desirable to avoid such artifacts. This may be achieved by tilting the apertures (and lenses) such that the integral of light performed vertical from the top of a row of apertures to the bottom of the row of apertures has a total brightness that is independent from where the integral is made, i.e. the integral of light along a first vertical line spanning from top to bottom of a row has a total brightness being less than 20% different such as 10% than the total brightness of the integral of light along a second vertical line (different from the first vertical line)—when displaying an image having image data defining an image of uniform brightness, and observing from in front of the lenses, i.e. the integration of light is performed in front of the lenses (after the light has passed the lenses)—in a vertical plane in front of the lenses. Thus, it also ensures that some parts of an image are not brighter or darker than they should, i.e. what the image data of the image defines. Said in other words, an aperture has a component along a horizontal and vertical axis, i.e. a projection along these two axis. It is desirable to have an overlap between the projection on a horizontal axis of a first aperture and the projection on the horizontal axis of a neighboring aperture, or at the very least that the two projections contact each other, i.e. with no clearance between them.

In praxis the angle may be determined by rotating the apertures and lenses until the appearance of artifacts has been minimized.

Each lens may be a plano-convex rectangular cylinder lens. In praxis the lenses may be a cylindrical for compensating for aberrations, i.e. not perfectly cylindrical, but substantial cylindrical, e.g. a cylindrical base form with added aspheric coefficients, i.e. the radius may vary no more than 20% such as 10%.

The green striped lines (first green striped line 52) illustrate the edges of the cylinder lenses.

Each aperture may have a width corresponding to half the width/diameter of a lens, and as can be seen in FIG. 4, the apertures changes position with respect to the lens from even to odd lines, i.e. on the first line the apertures are behind the right hand side of each lens—as seen from in front of the layer of optical devices. On the second line the apertures are behind the left hand side of each lens in that line, and on the third line the apertures are again behind the right hand side of each lens. Light entering the right hand side of a lens will be refracted to the left, because a convex lens mirrors the image.

If the viewing zones have different size (angular range to give a small and large viewing zone)—asymmetric multiview display, the width of the apertures may be different from half of the width of the lens, i.e. the apertures for the smaller viewing zone may have a width of 40% of the lens width, and the apertures for the larger viewing zone may have a width of 60% of the lens width for example.

Between the lines there may be an area where there are no apertures in the aperture mask.

The axis of a cylinder lens is the axis in the longitudinal/length direction of the cylinder geometry of the lens, i.e. the lens may have a radial extent (diameter) that is greater than its length, but the axis is still in the length direction, i.e. parallel to the center/cylinder axis of the cylinder Each lens extends from top to bottom as can be seen from FIG. 4. And together with the aperture mask the result is that backlight is either refracted left or right depending on the (row) line of the display.

Instead of having lenses extending top to bottom there may also be a plurality of lenses in each line, and those lenses do not have an extent greater than one line.

Each lens may have the same angle has described for the apertures, i.e. each lens is slanted/tilted/inclined (the longitudinal axis of a lens is not vertical, but has an angle with respect to a vertical line). The angle may be greater than zero degrees and less than 90 degrees with respect to vertical, i.e. neither vertical nor is it horizontal, for example 5 to 30 degrees such as 20+/−5 degrees such as 15+/−5 degrees such as 15+/−10 degrees such as 10+/−5 degrees. In FIG. 4 it is illustrated as more vertical than horizontal, i.e. a larger component along the vertical axis than the component along the horizontal axis. To compare to a horizontal plane the angle would be calculated as 90-20+/−5=70+/−5 degrees.

The lenses may be complemented with or substituted by prisms (which may also dispense with the aperture mask), i.e. each line may have a number of prisms. The prisms being different, i.e. belong to two different sets of prisms in order to direct light right or left. The prisms may provide higher observation angles. In praxis the prisms may be integrated in the lenses As an alternative to lenses a parallax barrier such as a micro louvre film may be used. Each louver constitutes a slat that extends vertically, or extends to a higher degree in the vertical direction than in the horizontal direction just like with the case of the lenses described above.

In general, the layer of optical devices may comprise a first set of optical devices and a second set of optical devices.

The first set of optical devices comprises optical devices for directing light from the backlight to the first viewing zone.

The second set of optical devices comprises optical devices for directing light from the backlight to the second viewing zone. The optical devices from the two sets are thus different from each other, or at least directs light to different viewing zones.

The optical devices from the first set of optical devices may have a distribution or pattern across the area of the layer of optical devices. This distribution may be a function of the distribution of the light emitters from the first set of light emitters.

By a "function" is meant that the distribution of optical devices is not independent from how the backlight is arranged, i.e. the distribution of optical devices from the first set of optical devices may depend on the distribution of the light emitters of the first set of light emitters.

The optical devices from the second set of optical devices may have a distribution or pattern across the area of the layer of optical devices. This distribution may be a function of the distribution of the light emitters from the second set of light emitters. Thus, the distribution of optical devices from the second set of optical devices may depend on the distribution of the light emitters of the second set of light emitters.

The distribution of optical devices from the first set of optical devices being different from the distribution of optical devices from the second set of optical devices.

When the light emitters of the backlight are arranged in lines (pattern where a number of lines has light emitters from the first set of light emitters and another number of lines has light emitters from the second set of light emitters) the optical devices are also arranged in lines where a number of lines has optical devices from the first set of optical devices followed by a number of lines that have optical devices from the second set of optical devices. The same is the case if the lines are zig-zagged.

The distance between the layer of optical devices and the vertical diffuser is a function of (depends on) the inclination/angle of the optical devices. If the optical devices have an axis inclination close to vertical (high angle with respect to horizontal plane) the distance may be higher than if the axis inclination is not so close to vertical (smaller angle with respect to horizontal plane). In general, the distance between the layer of optical devices and the vertical diffuser needs to be greater than the distance between the horizontal diffuser and the backlight.

The optical devices within the first set of optical devices may have angular light emission profiles that are functions of the positions of the optical devices, such that for example a first optical device within the first set of optical devices located near the left of the display has a first angular light emission profile directing light to the first viewing zone and a second optical device within the first set of optical devices located in the right of the display has a second angular light emission profile also directing light to the first viewing zone, where said first angular light emission profile is different from said second light emission profile and where said light emission profiles may be defined as angular distributions of emitted optical energy from the optical devices.

The optical devices within the second set of optical devices may likewise have angular light emission profiles that are functions of the positions of the optical devices, such that for example a third optical device within the second set of optical devices located near the left of the display has a third angular light emission profile directing light to the second viewing zone and a fourth optical device within the second set of optical devices located in the right of the display has a fourth angular light emission profile also directing light to the second viewing zone, where said third angular light emission profile is different from said fourth light emission profile.

This may "compensate" for the fact that the display has a certain area, i.e. the greater the area of the display, the farther away is the optical device to the far right from the optical device to the far left, hence the angle towards for example the first viewing region is different for the optical device to the far right and the optical device to the far left.

Figure 5:
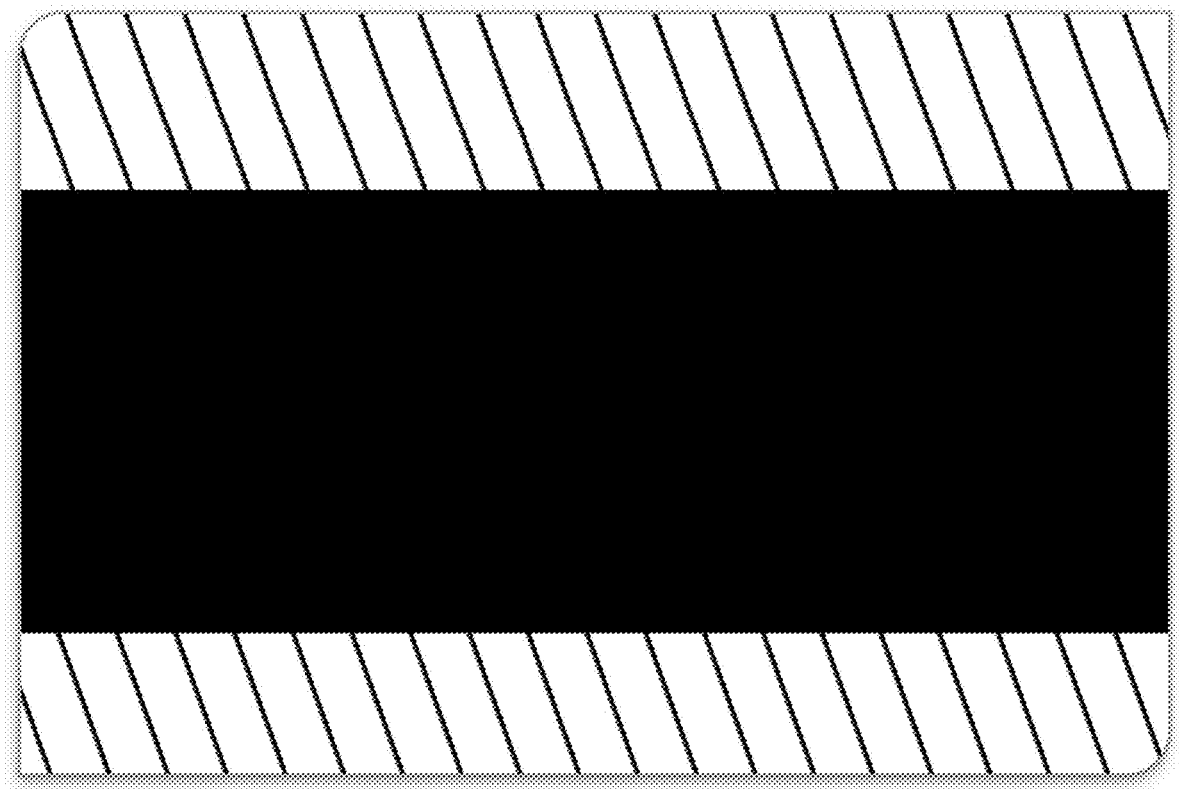
FIG. 5 depicts an illustrative display from a first viewing zone according to one or more aspects shown and described herein.

FIG. 5 shows the display seen from the first viewing zone, i.e. to the left of the display when the first light source is on.

As can be seen the first line and the second line lights up.

There are slanted dark lines. This is because in the example using lenses the lenses are not evenly illuminated due to the aperture mask is arranged such that a lens is not evenly illuminated in a horizontal plane. Furthermore, there may be a short distance between each optical device which means that the multiview display may appear as having dark lines between the optical devices.

To compensate for this each optical element may be tilted a bit, and together with the vertical diffuser the multiview display appears as having a more uniform illumination, i.e. the slanted arrangement of the optical devices provides a more uniform illumination when integrated vertically by a diffuser.

What is claimed is:

1. A multiview display for displaying a first image in a first viewing zone and a second image in a second viewing zone, the multiview display comprising:
a LCD panel for generating the first image and the second image;
a backlight including a first light source and a second light source, the first light source illuminating the LCD panel when the LCD panel generates the first image and the second light source illuminating the LCD panel when the LCD panel generates the second image;
a layer of optical devices disposed between the backlight and the LCD panel, the layer of optical devices comprising:
an aperture mask comprising a plurality of apertures, the aperture mask blocking light from the first light source to reach the second viewing zone and blocking light from the second light source to reach the first viewing zone such that the first image is visible only in the first viewing zone and the second image is visible only in the second viewing zone, and
a lenticular sheet positioned adjacent to the aperture mask,
a first diffuser disposed between the backlight and the layer of optical devices, the first diffuser arranged for diffusing light horizontally; and
a second diffuser between the layer of optical devices and the LCD panel, the second diffuser arranged for diffusing light vertically,
wherein a longitudinal axis of each aperture has an angle with respect to vertical in a range of 5 to 30 degrees such that an integral of light in a plane in front of the lenticular sheet along a first vertical line from the top of a row line of apertures to the bottom of the row line of apertures has a total brightness being less than 10% different than a total brightness of an integral of light along a second vertical line from the top to the bottom when displaying an image having image data defining an image of uniform brightness, the first vertical line being different from the second vertical line.

2. The multiview display according to claim 1, wherein the first light source is spatial separate from the second light source.

3. The multiview display according to claim 1, wherein the layer of optical devices is arranged such that the first viewing zone has a greater angular extent in a horizontal plane than the second viewing zone.

4. The multiview display according to claim 1, wherein the layer of optical devices is arranged between the backlight and the LCD panel.

5. The multiview display according to claim 1, wherein the first diffuser and the second diffuser are arranged on opposite sides of the layer of optical devices.

6. The multiview display according to claim 1, wherein the first diffuser is arranged for diffusing light horizontally.

7. The multiview display according to claim 1, wherein the second diffuser is arranged for diffusing light vertically.

8. The multiview display according to claim 1, wherein the first light source is arranged at a vertical position being higher than the vertical position of the second light source.

9. The multiview display according to claim 1, wherein the first light source includes a first set of light emitters and the second light source includes a second set of light emitters, the light emitters of the first set of light emitters and the light emitters of the second set of light emitters are arranged in a grid.

10. The multiview display according to claim 9, wherein the light emitters of the first set of light emitters and the second set of light emitters are arranged in an alternating pattern such that the multiview display comprises one or more lines of the grid having light emitters of the first set of light emitters followed by one or more lines of the grid having light emitters of the second set of light emitters.

* * * * *